United States Patent [19]

Saur et al.

[11] Patent Number: 5,183,012
[45] Date of Patent: Feb. 2, 1993

[54] THERMOSTATIC VALVE

[75] Inventors: Roland Saur, Stuttgart; Friedrich Bauer, Kornwestheim; Joachim Rothenpieler, Wolfsburg, all of Fed. Rep. of Germany

[73] Assignee: Behr-Thomson-Dehnstoffregler GmbH & Co., Fed. Rep. of Germany

[21] Appl. No.: 836,879

[22] Filed: Feb. 19, 1992

[30] Foreign Application Priority Data

Feb. 27, 1991 [DE] Fed. Rep. of Germany ... 9102294[U]

[51] Int. Cl.⁵ .............................................. F01P 7/14
[52] U.S. Cl. .............................. 123/41.08; 236/101 B; 236/101 C
[58] Field of Search ................ 123/41.08, 41.09, 41.1; 236/34, 34.5, 101 B, 101 C

[56] References Cited

U.S. PATENT DOCUMENTS 4,875,437 10/1989 Cook et al. ................... 123/41.13

FOREIGN PATENT DOCUMENTS 3226104 1/1984 Fed. Rep. of Germany .
3315308 10/1984 Fed. Rep. of Germany .
WO9004088 4/1990 World Int. Prop. O. .

Primary Examiner—Noah P. Kamen
Attorney, Agent, or Firm—Evenson, Wands, Edwards, Lenahan & McKeown

[57] ABSTRACT

In the case of a thermostatic valve for a coolant control of an internal-combustion engine, it is provided that a connecting element is provided which is made of a material having a low thermal conductivity so that a thermal uncoupling takes place between the valve housing part of the thermostatic valve and a thermostatic valve element which is mounted on it and is to be arranged outside the coolant flow.

20 Claims, 3 Drawing Sheets

THERMOSTATIC VALVE

BACKGROUND AND SUMMARY OF THE INVENTION

This invention relates to a thermostatic valve for a coolant control of an internal-combustion engine, having a thermostatic working element which is assigned to the coolant flow and whose working piston is supported in an abutment which can be adjusted by means of another thermostatic working element which is to be arranged outside the coolant flow and is mounted on a valve housing part.

By means of a thermostatic valve of this type, which is known from the German Patent Document DE-A 32 26 104, the control range of the thermostatic valve becomes adjustable. The working element, which is mounted on the valve housing part and is to be arranged outside the coolant flow, serves as an adjusting member which, because of its arrangement, is subjected to the ambient air temperature, particularly the engine compartment air of a motor vehicle. As a result, it is possible, also in the case of changing environmental conditions, to regulate the desired coolant temperature and therefore the desired engine temperature. In this case, it is also known to provide an additional electric heating device for the working element serving as the adjusting member by means of which further control parameters can be entered into the control.

It is also known (German Patent Document DE-A 33 15 308) to separate the thermostatic working element serving as the adjusting element from the thermostatic valve and to connect it with the working piston of the working element to be arranged in the coolant flow by way of remote-transmission devices, such as a Bowden cable, or the like. A development of this type, on the one hand, results in increased constructional expenditures while, on the other hand, such transmission devices are in the way, particularly in the case of combustion engines of motor vehicles, and prevent the mounting of other elements.

A thermostatic valve for a coolant control of an internal-combustion engine is also known (WO 90/04088) which comprises a thermostatic working element situated in the coolant flow whose working piston is supported on an abutment which is formed by the working piston of another thermostatic working element. This thermostatic working element is provided with an electric heating device so that the moving-out of its working piston can be controlled as a function of outside parameters. This thermostatic working element is mounted on a valve housing part, being surrounded by a plastic housing and being held on the valve housing part by means of a plastic holder. In this case, its working piston projects into the interior of the valve housing part so that it is situated in the coolant flow. The expansion agent, which is housed in this working element, must be designed such that its expansion does not take place before temperatures are reached which are clearly higher than the possible temperatures of the coolant.

It is an object of the invention to improve a thermostatic valve of the initially mentioned type such that a more precise control effect is achieved.

This object is achieved according to preferred embodiments of the invention in that a connecting element made of a material which has a lower thermal conductivity than metal is arranged between the valve housing part and the working element to be arranged outside the coolant flow.

By means of this development, a thermal uncoupling is achieved between the parts which come in contact with the coolant and are therefore heated by the coolant and the thermostatic working element serving as the adjusting element. Because of this uncoupling, the thermostatic working element can carry out its control function without any interference by the temperature of the coolant. The thermostatic working element, which is to be arranged outside the coolant flow, is therefore subjected almost exclusively to the ambient temperature; that is, when used in motor vehicles, to the engine compartment temperature.

In a development of the invention, it is provided that the thermostatic working element is held on the housing part by means of a holder made of a heat-insulating material. This results in a simple construction since the holder of this thermostatic working element already causes the thermal uncoupling.

In a further development of the invention, it is provided that, between the working element to be arranged outside the coolant flow and the valve housing part, at least one shield is provided against radiant heat coming from the valve housing part. This is used for a further improvement of the thermal uncoupling.

In a further development of the invention, it is provided that the holder is provided on the outside with cooling ribs enlarging its surface. This also further improves the thermal uncoupling because a heat dissipation takes place by wa of the cooling ribs before this heat may reach the thermostatic working element. In this case, the cooling ribs may be developed such that they serve as a shield; that is, that they are disposed between the thermostatic working element and the valve housing part.

In a further development of the invention, it is provided that the working piston of the working element to be arranged outside the coolant flow serves as the abutment which is arranged coaxially with respect to the working element to be arranged in the coolant flow. This results in a simple and very compact construction. In an advantageous development, it is provided in this case that, between the working piston of the working element assigned to the coolant flow and the working piston of the working element to be arranged outside the coolant flow, an intermediate member is arranged which is made of a material having a lower thermal conductivity than metal. Thus, it is ensured that no thermal bridge is created also between the working pistons of the two thermostatic working elements by which a direct heat transmission may take place to the working element serving as the adjusting member.

In a further development of the invention, it is provided that the thermostatic working element is detachably mounted on the holder and that the holder is provided with sealing devices which are assigned to the working piston of the working element assigned to the coolant flow or to an intermediate member arranged between the two working pistons and remaining in the holder. As a result, it is possible to remove the thermostatic working element serving as the adjusting member without opening up the coolant circulation as a result. This development of the holder provides that no coolant can emerge even when the thermostatic working element is removed.

In a further development of the invention, it is provided that the working element to be arranged outside the coolant flow is supported against the moving-out direction of its working piston in the holder by means of a lift-over spring. This ensures that the danger of damage is avoided also in the case of an overheating.

In a further development of the invention, it is provided that the circumferential surface of the intermediate member is constructed as a control cam for an electric control element mounted on the holder. As a result, it becomes possible to influence, as a function of the control elements that are to be electrically switched, particularly the drive of a cooling fan which is assigned to a radiator of the coolant circulating system. It therefore becomes possible to stop one or several stages of the cooling fan so that the cooling fan is not switched on with these stages when an increased coolant temperature is desired.

Other objects, advantages and novel features of the present invention will become apparent from the following detailed description of the invention when considered in conjunction with the accompanying drawings.

DETAILED DESCRIPTION OF THE DRAWINGS

Figure 1:
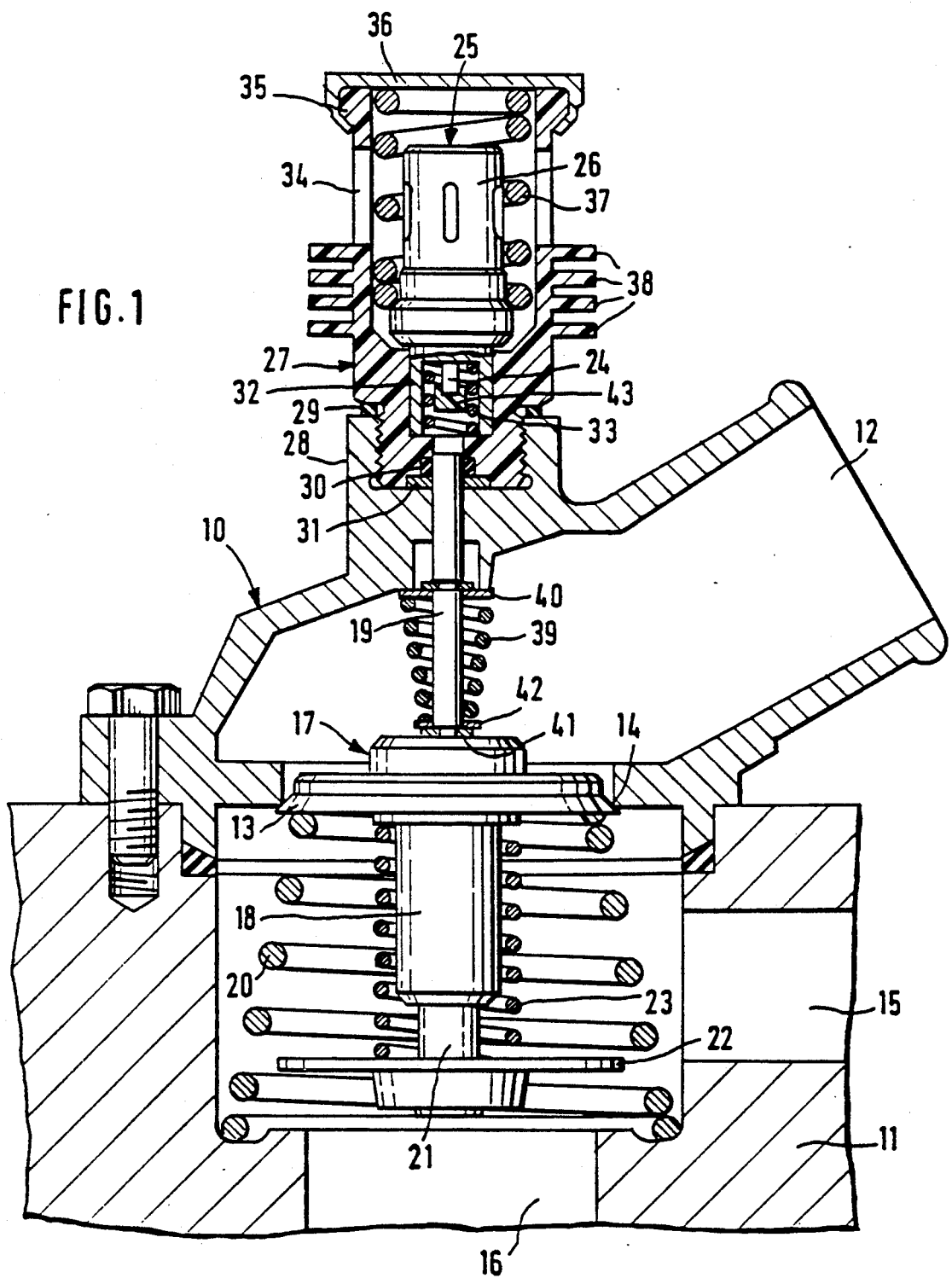
FIG. 1 is a sectional view of a first embodiment of a thermostatic valve according to the invention.

The thermostatic valve illustrated in FIG. 1 has a valve housing part 10 which is fastened to a second housing part 11. The housing part 11 may, for example, by a cylinder head or an engine block of an internal-combustion engine or a water pump housing or the like. The valve housing part 10 has a connecting sleeve 12 which can be closed off by means of a valve disk 13 to which a valve seat 14 is assigned. In the housing part 11, two connections 15, 16 are provided of which connection 16 is provided for a short-circuit line. The thermostatic valve may be arranged between an internal-combustion engine and a radiator in the forward flow or the return flow, in which case connections 12, 15, 16 are switched correspondingly.

The thermostatic valve comprises a thermostatic working element 17 which is disposed in the coolant flow and which has a housing 18 filled with an expansion agent, particularly wax, and a working piston 19 which is driven out corresponding to the heating of the expansion agent. The valve disk 13 is mounted on the housing 17. It is loaded by means of a closing spring 20 in the direction of the valve seat 14 against which it rests in a closing manner when the coolant is cold. On the side opposite the working piston 19, a pin 21 is mounted on the housing 18 of the thermostatic working element 17 on which a short-circuit valve disk 22 is slidingly guided which is loaded by means of a short-circuit spring 23.

An abutment is assigned to the working piston 19 of the thermostatic working element 17 against which it runs when it moves out so that a subsequent farther moving-out movement results in a movement of the housing 18 of the thermostatic working element 17 and thus in a lifting of the valve disk 13 off the valve seat 14. As a result of this movement, the short-circuit disk 22 will then also move against the short-circuit connection 16 and close it gradually. As the abutment for the working piston 19, the working piston 24 of a thermostatic working element 25 is used which has a housing 26 filled with an expansion agent and which is arranged outside the coolant flow. This thermostatic working element 25 is subjected to the ambient temperature; that is, when used for an internal-combustion engine of a motor vehicle, to the engine compartment temperature. The expansion agent of this working element 25, particularly a wax, is adjusted such that its working piston 24 will not move out until an ambient temperature is increased so that therefore the control range of the thermostatic valve can be influenced. As a function of the position of the working piston 24 of the thermostatic working element 25, the working piston 19 of the thermostatic working element 17 must carry out a more or less large idle stroke before it is supported against the working piston 24 so that subsequently the valve disk 13 is lifted off the valve seat 14. When the ambient temperature is low, the working piston 24 remains moved in so that the valve 13, 14 will open later and will therefore have a higher opening temperature.

The thermostatic working element 25 to be arranged outside the coolant flow is fastened by means of a holder 27 on the valve housing part 10 in such a manner that its working piston 24 is aligned coaxially with respect to the working piston 19 of the working element 17. By means of a projection 28 having an external thread, the holder 27 is screwed into a projection 28 of the valve housing part 10 provided with an internal thread. A sealing ring 29 is arranged between the two. The working piston 19 of the thermostatic working element 17 penetrates the projection 28 and projects into the holder 27. In this area, the holder 27 is provided with a sealing ring 30 surrounding the working piston 19 which is held by means of an inserted plate 31.

The thermostatic working element 25, by means of a guide projection 32 projecting from its housing 26, is inserted into a corresponding recess of the holder 27. A restoring spring 33, which is supported against the bottom of the holder 27, acts upon the working piston 24 of the thermostatic working element 25. By means of webs 34, the holder 27 surrounds the housing 26 of the thermostatic working element 25 and ends with a closed ring 35. On the closed ring 35, a cap-type securing element 36 is mounted against which a lift-over spring 37 is supported, the other end of which rests against a ring collar of the housing 26 of the working element 25 and presses it by means of its guide projection 32 into the corresponding recess of the holder 27.

The holder 27 is made of a material which has a significantly lower thermal conductivity than metal, particularly of a plastic material. As a result, a thermal uncoupling is obtained between the valve housing part 10, which during the operation reaches approximately the temperature of the coolant, and the thermostatic working element 25 which is to reach the ambient temperature. The holder 27 is provided with several cooling ribs 38 which improve the heat dissipation from the holder 27. In addition, the ring-shaped cooling ribs are arranged such with respect to the working element 25 that this working element 25 is largely shielded with respect to the thermal radiation coming from the valve housing part 10.

A restoring spring 39 is assigned to the working piston 19 of the thermostatic working element 17 to be arranged in the coolant flow, is supported by way of a spring plate 40 on the valve housing part 10, and loads a spring plate 42 supported on a projection 41 of the working piston 19.

In order to prevent that a thermal bridge occurs during the operation between working piston 19 and working piston 24, a heat-insulating intermediate member is arranged between the two which, in the case of the illustrated embodiment, is constructed as a cap 43 made of plastic arranged on the working piston 24 of the working element 25. It is also provided, according to other contemplated preferred embodiments, to mount such an intermediate member on the working piston 19. Likewise, it is contemplated to construct the working piston 19 in two parts and to construct particularly the part projecting through the projection 28 into the holder 27 as a sleeve which forms one piece with the spring plate 40 and is fitted onto the working piston 19.

Since the working piston 19 or an intermediate member fitted onto it projects into the area of the sealing device 30, after the cap-type securing device 36 is removed, the thermostatic working element 25 may be removed. As a modification of the embodiment according to FIG. 1, it may be provided in a similar manner as in 15 the case of the embodiment according to FIG. 2 that the projection 28 into which the holder 27 is screwed is open toward the inside in the direction of the valve housing part 10; that is, in the direction of the thermostatic working element 17. Also in this case, if the working piston 19 or an intermediate part or a connecting part projects into the area of the sealing device 30, the thermostatic working element 25 may be removed without the creation of a leakage point through which the coolant may be discharged.

As a modification of the embodiment according to FIG. 1, it may also be provided that the holder 27 is not screwed into the projection 28 of the valve housing part 10 by means of a screw insert but is fastened to it by means of a flanged joint. Such a flange may then also at least partially take over the function of a cooling rib and/or of a shield against thermal radiation.

In a further modification of the embodiment according to FIG. 1, it is provided that the sealing device 30, such as an O-ring, is arranged in a ring groove of the valve housing part 10 and surrounds the working piston 19 or an extension part lengthening this working piston 19 or a transition piece. In this case, the holder 27 may be removed together with all elements held by it, without creating any leakage point and coolant discharging to the outside.

Figure 2:
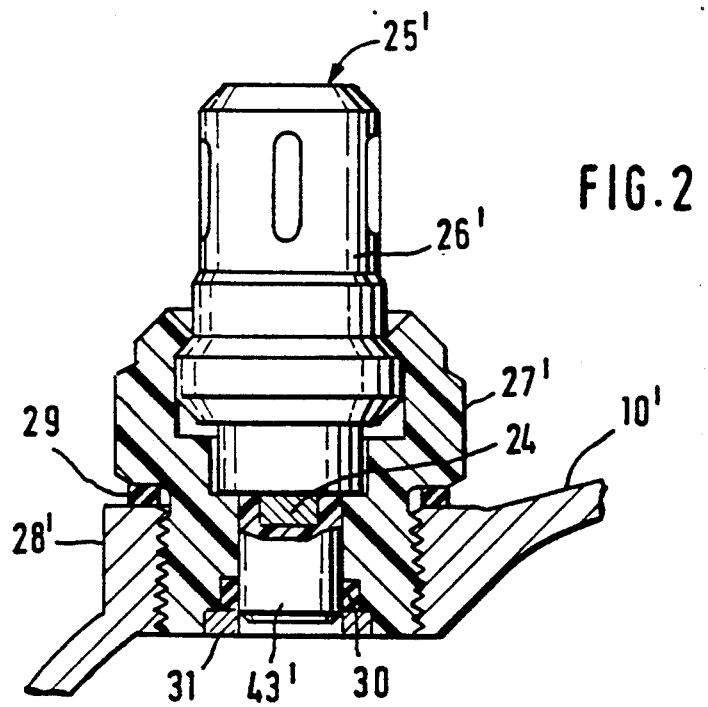
FIG. 2 is a partial sectional view of the area of a thermostatic working element to be arranged outside the coolant flow and serving as an adjusting element.

A simplified embodiment is illustrated in FIG. 2. As mentioned above, in the case of this embodiment, the projection 28' of the valve housing part 10 is open toward the inside; that is, it is constructed as a passage bore. The holder 27', which is also made of a plastic material having only a low thermal conductivity, seals off the bore of the projection 28'. On the outside, it is surrounded by a sealing ring 29. On the inside, a sealing ring 30, which is held by a plate 31, surrounds an intermediate plastic member 43' which, in the manner of a cap, is arranged on the working piston 24 of the thermostatic working element 25. In a manner not shown in detail, the thermostatic working element 25' is provided with an inner restoring spring for the working piston 24 by which the working piston 24 is loaded in the direction of its cold basic position.

The housing 26' of the thermostatic working element 25' is form-lockingly held in the holder 27' by means of a bead. A lift-over spring is not provided. This is permissible when the expansion agent of this thermostatic working element 25' is designed for a relatively high temperature; that is, a temperature which is not significantly exceeded also in an extreme case.

Figure 3:
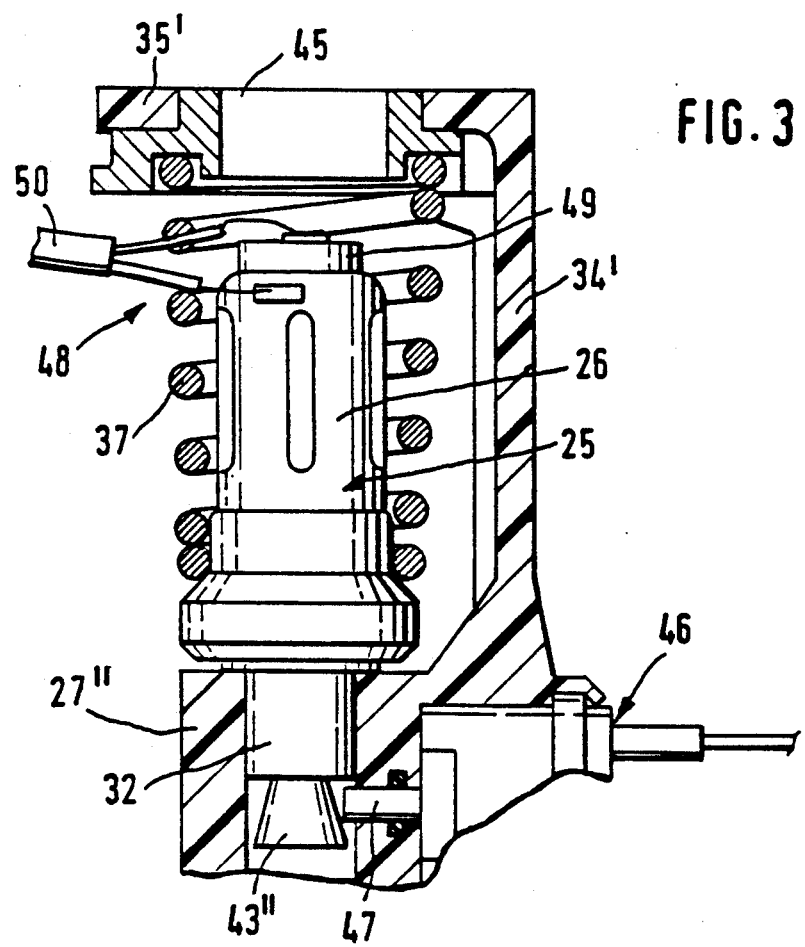
FIG. 3 is a partial sectional view of another embodiment in the are of the thermostatic working element serving as the adjusting element, the adjustment of which actuates an electric switch.
Figure 4:
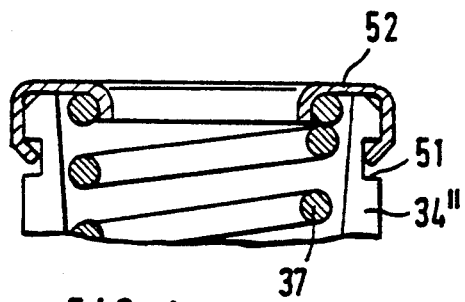
FIGS. 4 to 7 are views of embodiments for the mounting of supporting elements for a lift-over spring which holds the thermostatic working element serving as the adjusting element in the operative position.

The embodiment which is shown as a partial sectional view in FIG. 3, corresponds to the embodiment according to FIG. 1 in its basic construction. The housing 26 of the thermostatic working element 25 is held in its working position by means of a lift-over spring 37. The holder 27 is provided with a ring 35' which is held by means of one or several webs 34'. In the ring 35', a bush 45 is supported which serves as an abutment for the lift-over spring 37. The bush 45 can be removed in the direction of the working element 25 so that, as a result, the working element 25 may also be removed.

The cap 43", which is fastened to the working piston of the thermostatic working element 25, which working piston is not visible in FIG. 3, and which cap 43" serves as a heat-insulating intermediate member is at the same time constructed as a control cam for an electric switch 46. A transmission pin 47 of the switch 46 rests against this cap 43" which has a truncated-cone shape. When the working piston of the thermostatic working element 25 moves out when the adjusted temperature is reached, the cap 43" moves in such a manner (downward in FIG. 3) that the transmission pin 47 moves out of the switch 46 and switches as a result. The switch 46 is, for example, constructed as a break switch which in this case opens a circuit which leads to a fan assigned to a radiator and which is intended for a power stage assigned to a lower coolant temperature. As a result, it is achieved that the fan is not switched on at this lower temperature so that the desired coolant temperature rise can also not be reversed by the switching-on of the fan.

The thermostatic working element 25 is subjected to the ambient temperature. Thus, as a function of the ambient temperature, an automatic adjusting takes place of the working rang of the thermostatic valve. Furthermore, the thermostatic working element 25 is connected to an electric heating device 48 by means of which additional parameters can be entered into the control of the thermostatic valve, such as the oil temperature, the vacuum in the intake or the like. The heating device comprises a disk-shaped PTC-resistor element 49 which is connected to an electric supply line 50, the other pole of which is connected to the housing 26 of the working element 25.

FIGS. 4 to 7 show several constructions of detachable securing elements by which the lift-over spring 37 is detachably fastened to a holder 27 corresponding to FIGS. 1 or 3. In the embodiment according to FIG. 4, the holder 27 is provided with webs 34" which are provided on the outside with recesses 51 into which a spring plate 52 is clipped by means of its bent edge. By means of a radial compressing of the webs 34", the spring plate 52 can be disengaged so that the lift-over spring 37 and therefore also the thermostatic working element 25 can be removed.

Figure 5:
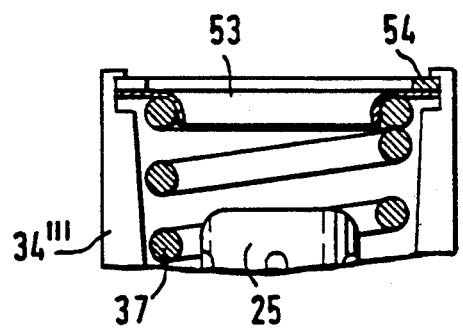

Also in the embodiment according to FIG. 5, the holder 27 is provided with webs 34''' which, on their ends, are not connected with one another by means of a ring. On the inside, the webs 34''' are provided with recesses into which a spring plate 53 is inserted which is held by means of a securing ring 54.

Figure 6:
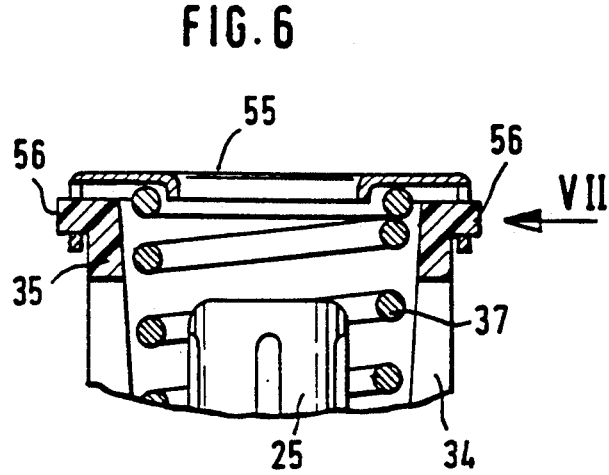
Figure 7:
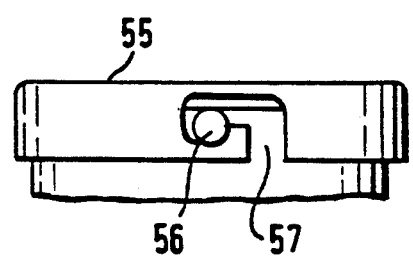

In the embodiment according to FIGS. 6 and 7, a cap-type spring plate 55 is detachably held by means of a quarter-turn fastener on the ring 35 which connects the webs 34 of the holder 27. The ring 35 is provided with at least two diametrically opposite pins 56 by means of which an approximately C-shaped slot guide 57 of the spring ring 55 can be engaged in the manner of a quarter-turn fastener. The spring ring 55 is held by means of the force of the lift-over spring 37 in the locked position in which the pins 56 are each engaged in an undercut section of the slot guide 57.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A thermostatic valve for a coolant control of an internal-combustion engine, comprising:
   a valve housing made of a metal,
   a first thermostatic working element assigned to engine coolant flow and having a first working piston movable in response to temperature changes in the coolant flow to control a coolant flow control valve in the valve housing,
   and a second thermostatic working element arranged outside the coolant flow in fluid communication with an ambient air space and having a second working piston movable in response to temperature changes in the ambient air space temperature, said second working piston supporting an abutment member operatively engageable by the first working piston to thereby control the operating position of the first working piston as a function of the ambient air space temperature,
   wherein the second thermostatic working element is thermally separated from the coolant and from elements coming in contact with the coolant,
   and wherein a connecting element having a lower thermal conductivity in comparison to said metal of said valve housing is arranged between the valve housing and the second thermostatic working element to assist in thermally separating the same from the coolant.

2. A thermostatic valve according to claim 1, wherein the connecting element is a holder made of a heat-insulating material for holding the second thermostatic working element on the valve housing.

3. A thermostatic valve according to claim 2, wherein the holder is provided on the outside with cooling ribs which enlarge its surface.

4. A thermostatic valve according to claim 2, wherein the second thermostatic working element is detachably mounted on the holder, and wherein the holder is provided with sealing devices which are assigned to one of the first working piston and an intermediate member arranged between the two working pistons and remaining in the holder.

5. A thermostatic valve according to claim 2, wherein the second thermostatic working element is supported against the moving-out direction of the second working piston in the holder by means of a lift-over spring.

6. A thermostatic valve according to claim 2, wherein an intermediate member is arranged between the first working piston and the second working piston, which intermediate member is made of a material having a lower thermal conductivity than metal.

7. A thermostatic valve according to claim 6, wherein a circumferential surface of the intermediate member is constructed as a control cam for an electric control element mounted on the holder.

8. A thermostatic valve according to claim 7, wherein at least one shield is provided between the second working element and the valve housing part to protect against radiation heat coming from the valve housing.

9. A thermostatic valve according to claim 2, wherein at least one shield is provided between the second working element and the valve housing part to protect against radiation heat coming from the valve housing.

10. A thermostatic valve according to claim 9, wherein the holder is provided on the outside with cooling ribs which enlarge its surface.

11. A thermostatic valve according to claim 2, wherein the second working piston is used as an abutment for the first working piston and is arranged coaxially with respect to the first thermostatic working element.

12. A thermostatic valve according to claim 11, wherein an intermediate member is arranged between the first working piston and the second working piston, which intermediate member is made of a material having a lower thermal conductivity than metal.

13. A thermostatic valve according to claim 12, wherein an intermediate member made of a heat-insulating material is mounted on the second working piston.

14. A thermostatic valve according to claim 13, wherein a electric heating element is assigned to the second thermostatic working element.

15. A thermostatic valve according to claim 14, wherein the second thermostatic working element is supported against the moving-out direction of the second working piston in the holder by means of a lift-over spring.

16. A thermostatic valve according to claim 1, wherein at least one shield is provided between the second working element and the valve housing part to protect against radiation heat coming from the valve housing.

17. A thermostatic valve according to claim 1, wherein the second working piston is used as an abutment for the first working piston and is arranged coaxially with respect to the first thermostatic working element.

18. A thermostatic valve according to claim 1, wherein an intermediate member is arranged between the first working piston and the second working piston, which intermediate member is made of a material having a lower thermal conductivity than metal.

19. A thermostatic valve according to claim 18, wherein an intermediate member made of a heat-insulating material is mounted on the second working piston.

20. A thermostatic valve according to claim 1, wherein an electric heating element is assigned to the second thermostatic working element.

* * * * *